US012802611B2

(12) United States Patent
Mattison et al.

(10) Patent No.: US 12,802,611 B2
(45) Date of Patent: Nov. 17, 2026

(54) SYSTEMS AND METHODS FOR DETERMINING DEVICE OUTPUT USING PHOTOELECTRIC DEVICES

(71) Applicant: BANK OF AMERICA CORPORATION, Charlotte, NC (US)

(72) Inventors: Paul Mattison, Sherrills Ford, NC (US); Matthew Edward Williams, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 19/010,782

(22) Filed: Jan. 6, 2025

(65) Prior Publication Data

US 2026/0196154 A1 Jul. 9, 2026

(51) Int. Cl.

| | |
|---|---|
| ***G09G 3/20*** | (2006.01) |
| ***G09G 3/34*** | (2006.01) |
| ***G09G 3/36*** | (2006.01) |

(52) U.S. Cl.

CPC ......... *G09G 3/2092* (2013.01); *G09G 3/3406* (2013.01); *G09G 3/3648* (2013.01); *G09G 3/34* (2013.01); *G09G 3/3413* (2013.01); *G09G 2320/06* (2013.01); *G09G 2320/0666* (2013.01); *G09G 2320/0686* (2013.01); *G09G 2320/0693* (2013.01); *G09G 2330/12* (2013.01); *G09G 2360/145* (2013.01); *G09G 2360/147* (2013.01);

(Continued)

(58) Field of Classification Search

CPC ...... G09G 3/2092; G09G 3/34; G09G 3/3406; G09G 3/3413; G09G 3/3648; G09G 2320/06; G09G 2320/0666; G09G 2320/0686; G09G 2320/0693; G09G 2330/12; G09G 2360/145; G09G 2360/147; G09G 2360/148; G09G 2360/16

See application file for complete search history.

(56) References Cited

U.S. PATENT DOCUMENTS

| | | | |
|---|---|---|---|
| 7,724,259 | B2 | 5/2010 | Hedrick |
| 8,514,250 | B2 | 8/2013 | Naimer |
| 9,164,860 | B2 | 10/2015 | Manz |

(Continued)

FOREIGN PATENT DOCUMENTS

| | | | |
|---|---|---|---|
| EP | 2308712 | A1 | 4/2011 |
| EP | 2254039 | B1 | 12/2012 |

(Continued)

*Primary Examiner* — William Boddie
*Assistant Examiner* — Saifeldin E Elnafia
(74) *Attorney, Agent, or Firm* — Moore & Van Allen PLLC; William Walters

(57) ABSTRACT

Systems, computer program products, and methods are described herein for determining device output using photoelectric devices. The present disclosure may be configured to receive, via a monitoring device, an actual display value. The actual display value may include one or more light patterns emitted from a display device. The present disclosure may be configured to determine an expected display value. The expected display value includes one or more expected light patterns that are expected to be emitted from the display device. The present disclosure may be configured to determine an anomaly associated with the display device. The anomaly may include a difference between the actual display value and the expected display value.

17 Claims, 11 Drawing Sheets

(52) U.S. Cl.
CPC ... *G09G 2360/148* (2013.01); *G09G 2360/16* (2013.01)

(56) References Cited

U.S. PATENT DOCUMENTS

| | | | | |
|---|---|---|---|---|
| 9,892,479 | B1 | 2/2018 | Pruitt | |
| 10,134,139 | B2 | 11/2018 | Gulati | |
| 10,540,738 | B2 | 1/2020 | Viggers | |
| 11,131,987 | B2 | 9/2021 | Wang | |
| 2008/0100611 | A1 | 5/2008 | Block | |
| 2011/0057951 | A1 | 3/2011 | Bogenberger | |
| 2011/0063452 | A1 | 3/2011 | Fifis | |
| 2013/0155093 | A1 | 6/2013 | He | |
| 2015/0277838 | A1 | 10/2015 | Gyllensward | |
| 2016/0071231 | A1 | 3/2016 | Bargh | |
| 2017/0124928 | A1* | 5/2017 | Edwin | G01B 11/22 |
| 2019/0013826 | A1 | 1/2019 | Kikuta | |
| 2021/0201779 | A1* | 7/2021 | Kim | G09G 3/3233 |
| 2021/0225327 | A1* | 7/2021 | Matsumoto | G09G 5/10 |
| 2022/0366846 | A1* | 11/2022 | Chang | G09G 3/3225 |

FOREIGN PATENT DOCUMENTS

| | | | |
|---|---|---|---|
| EP | 2778617 | A2 | 9/2014 |
| EP | 2447844 | B1 | 9/2022 |
| JP | 3789917 | B2 | 6/2006 |
| JP | 5010863 | B2 | 8/2012 |

* cited by examiner

SYSTEMS AND METHODS FOR DETERMINING DEVICE OUTPUT USING PHOTOELECTRIC DEVICES

TECHNOLOGICAL FIELD

Example embodiments of the present disclosure relate to determining device output using photoelectric devices.

BACKGROUND

There are significant challenges associated with reliably determining device output. Applicant has identified a number of deficiencies and problems associated with conventional manners used to determine an output of a device. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for determining device output using photoelectric devices.

Embodiments of the present invention address the above needs and/or achieve other advantages by providing apparatuses (e.g., a system, computer program product, and/or other devices) and methods for determining device output using photoelectric devices. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present disclosure provides for determining device output. In some embodiments, the solutions as provided herein may receive, via a monitoring device, an actual display value, wherein the actual display value includes one or more light patterns emitted from a display device. In some embodiments, the disclosure provides for a solution that may determine an expected display value, wherein the expected display value may include one or more expected light patterns that are expected to be emitted from the display device. In some embodiments, the disclosure provides a solution that may determine an anomaly associated with the display device, wherein the anomaly includes a difference between the actual display value and the expected display value.

In some embodiments, the display device may be associated with a first platform and the monitoring device may be associated with a second platform.

In some embodiments, the second platform may be functional in an instance in which the first platform experiences the anomaly associated with the display device.

In some embodiments, the actual display value may include at least one of lumen data including a brightness of the one or more light patterns, kelvin data including a color tone of the one or more light patterns, or color data include a color of the one or more light patterns.

In some embodiments, the monitoring device may include a photoelectric device configured to generate, based on the one or more light patterns, at least one of a lumen value including a brightness of the one or more light patterns, a kelvin value including a color tone of the one or more light patterns, or a color value including a color of the one or more light patterns.

In some embodiments, the anomaly may include the lumen value associated with the actual display value being less than an expected lumen value associated with the expected display value.

In some embodiments, the monitoring device may be operatively coupled to the display device.

In some embodiments, the monitoring device may receive the actual display value associated with the one or more light patterns emitted from at least a portion of the display device.

In some embodiments, the monitoring device may receive the actual display value associated with the one or more light patterns emitted from the entire display device.

In some embodiments, the solutions provided herein may include an artificial intelligence (AI) engine configured to determine the expected display value in real time, wherein the AI engine is trained on baseline parameters associated with the expected display value.

In some embodiments, the AI engine may be configured to determine the anomaly associated with the display device in real time based on the difference between the expected display value and the actual display value.

In some embodiments, the monitoring device may receive an unexpected light pattern associated with a second light source. In some embodiments, the AI engine may be further configured to determine the unexpected light pattern and determine the anomaly is not caused by the unexpected light pattern.

In some embodiments, the actual display value may include a first display value, and the anomaly may include the display device emitting the first display value in an instance in which the display device is expected to be emitting a second display value.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany-ing drawings. The components illustrated in the figures may or may not be present in certain embodiments described herein. Some embodiments may include fewer (or more) components than those shown in the figures.

Figure 1A:
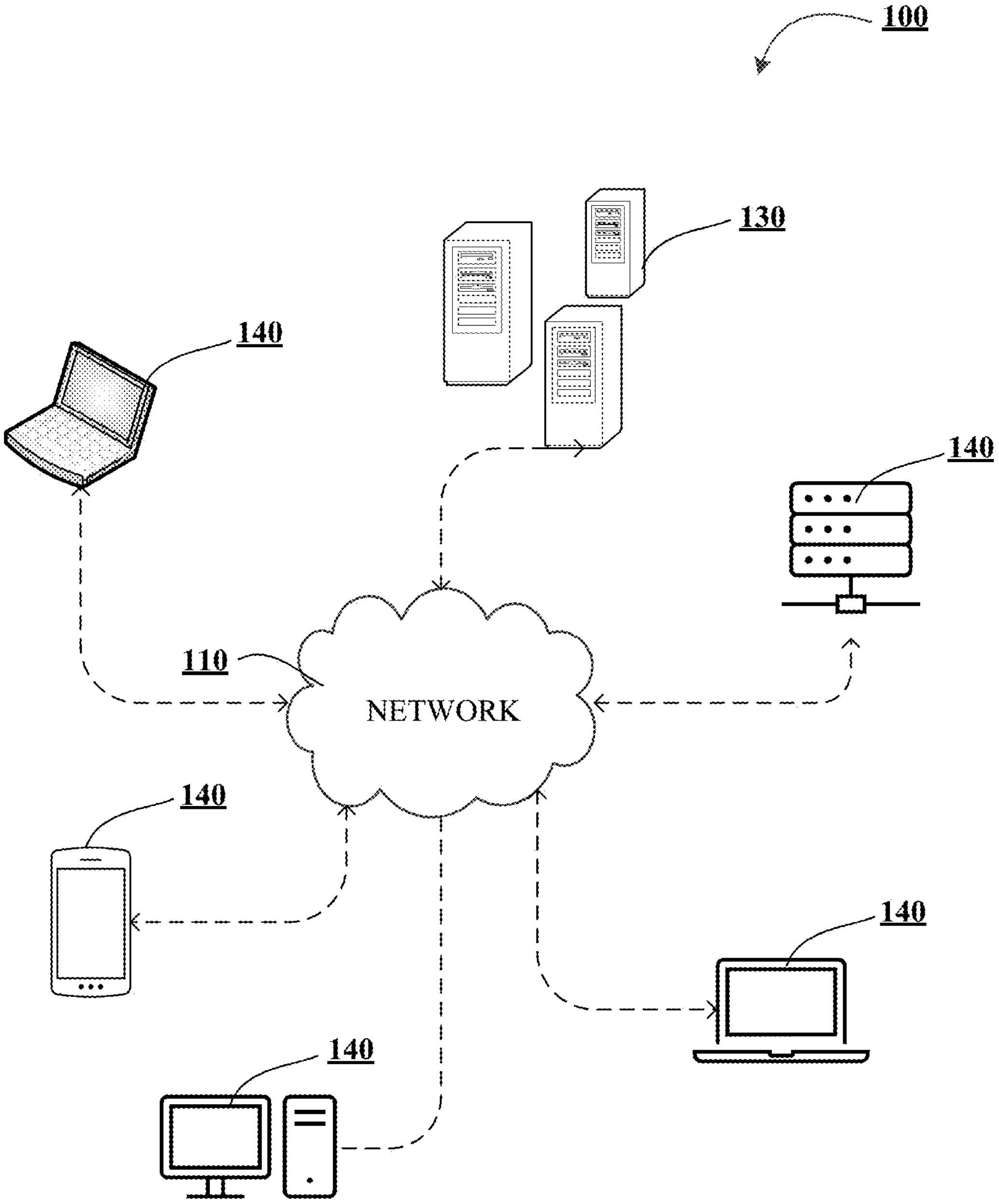
Figure 1B:
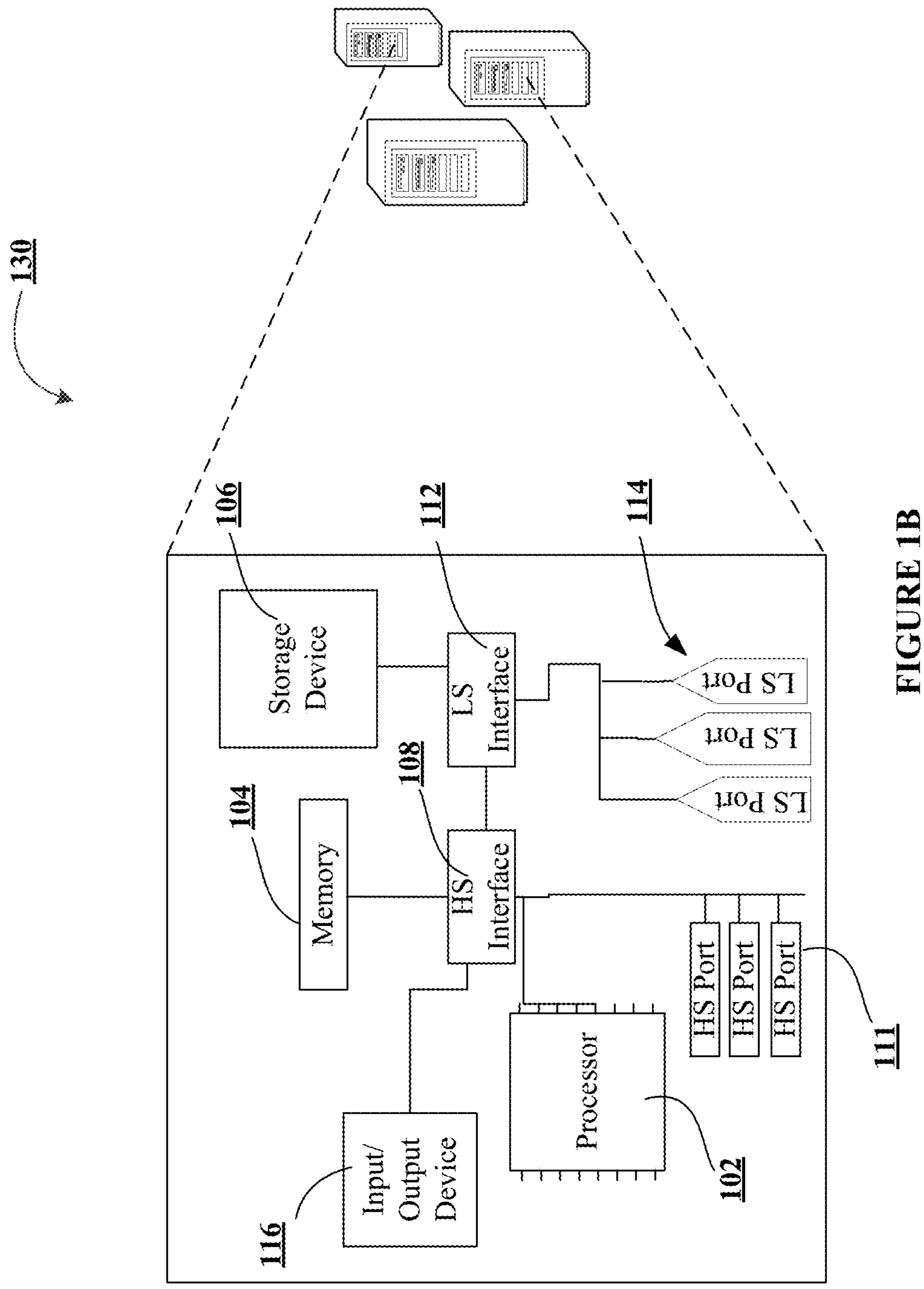
Figure 1C:
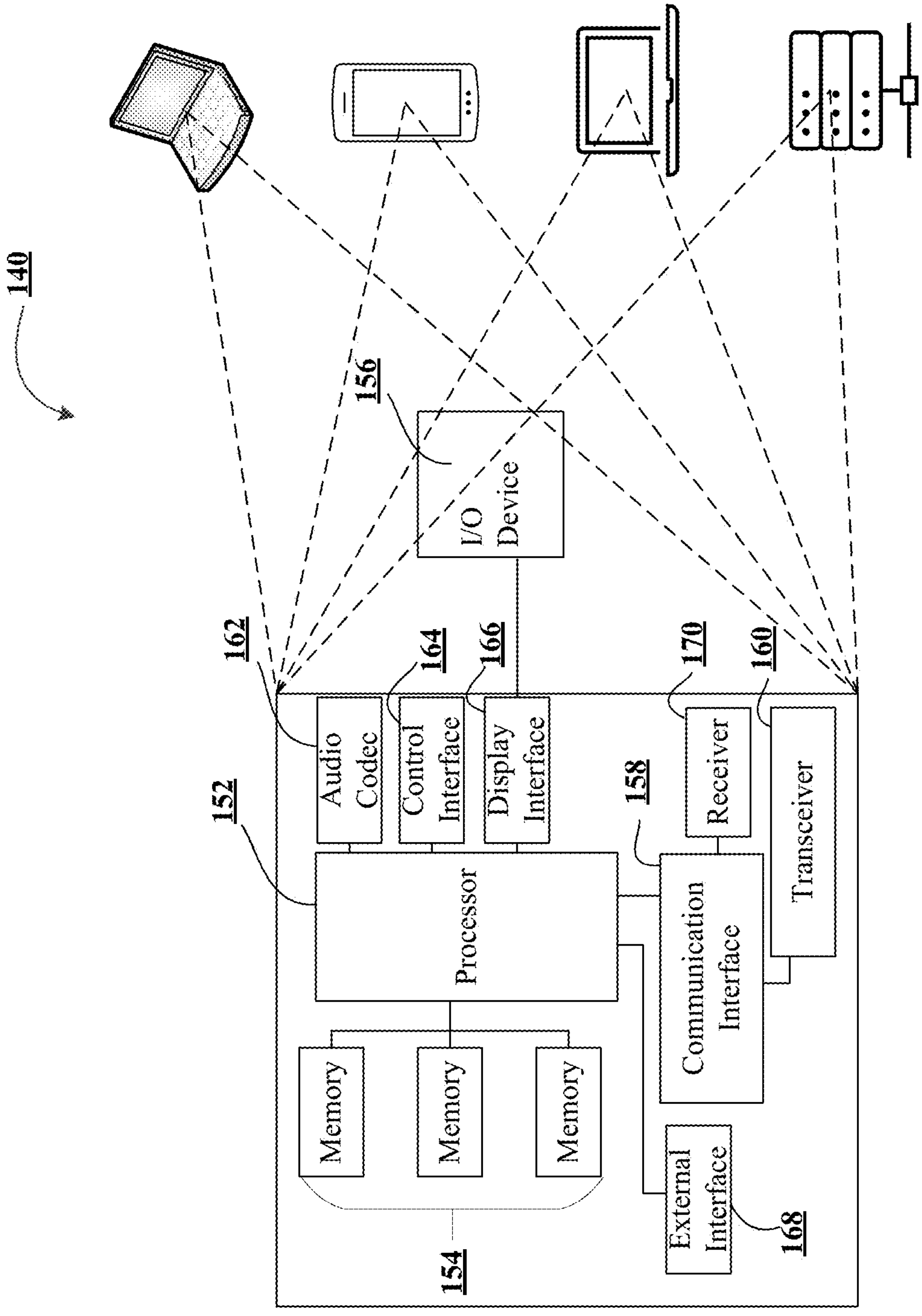
Figure 2:
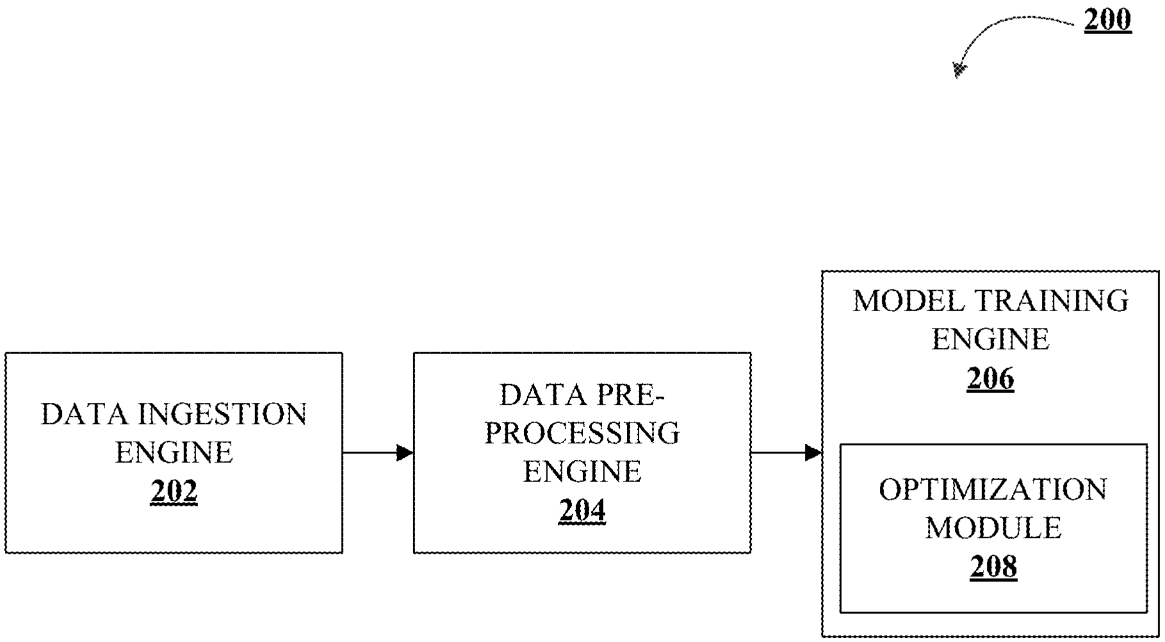
Figure 3:
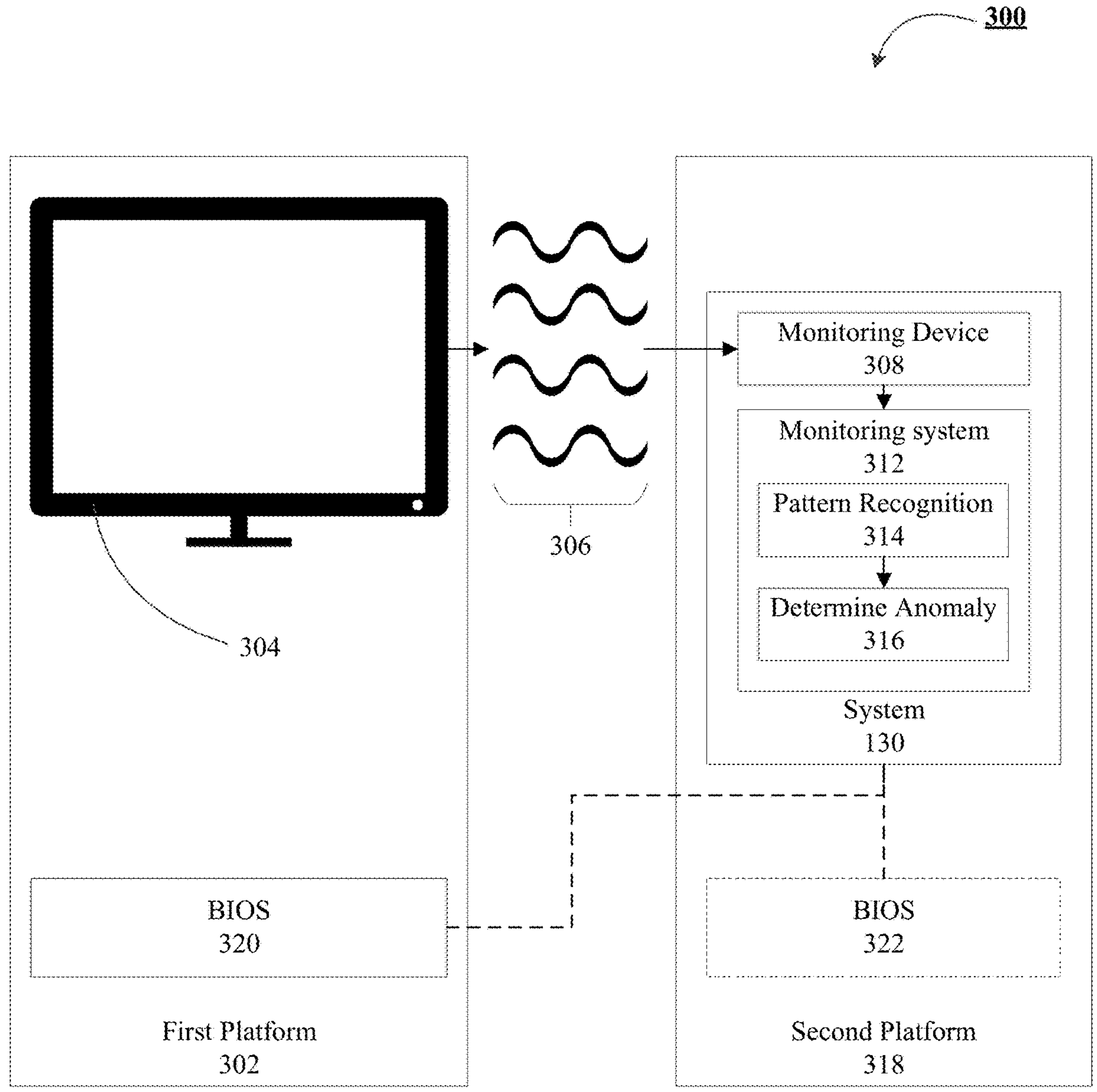
Figure 4:
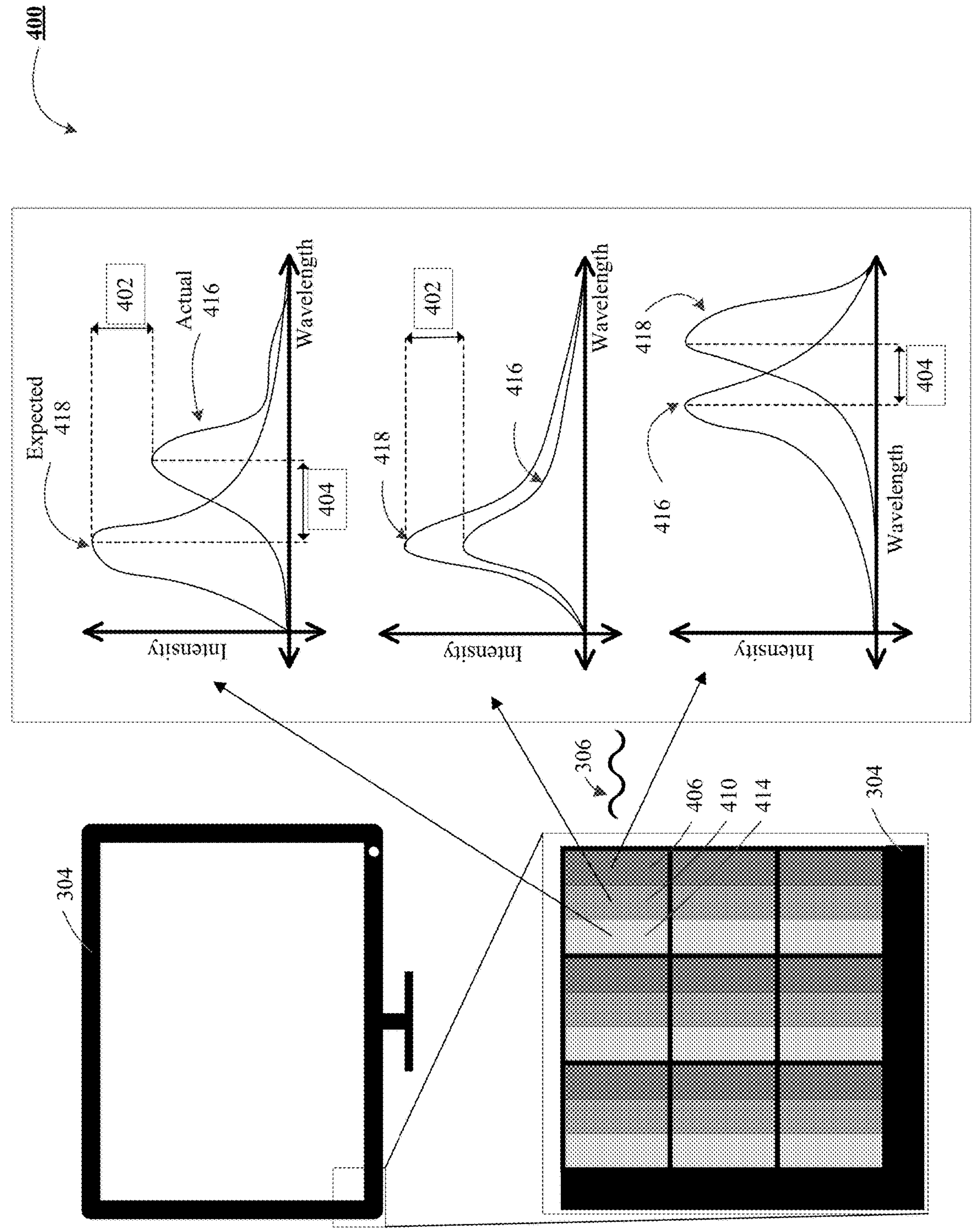
Figure 5:
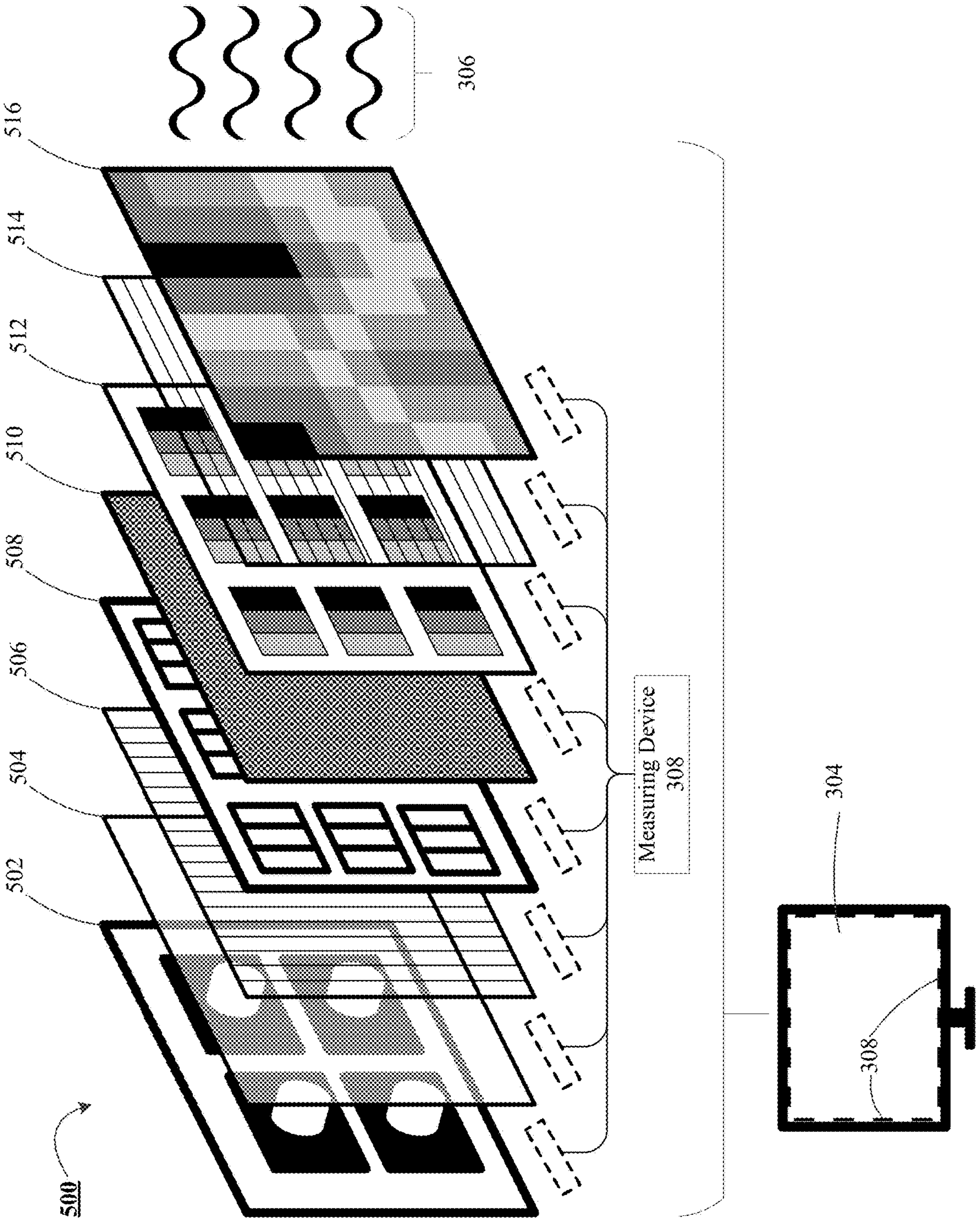
Figure 6:
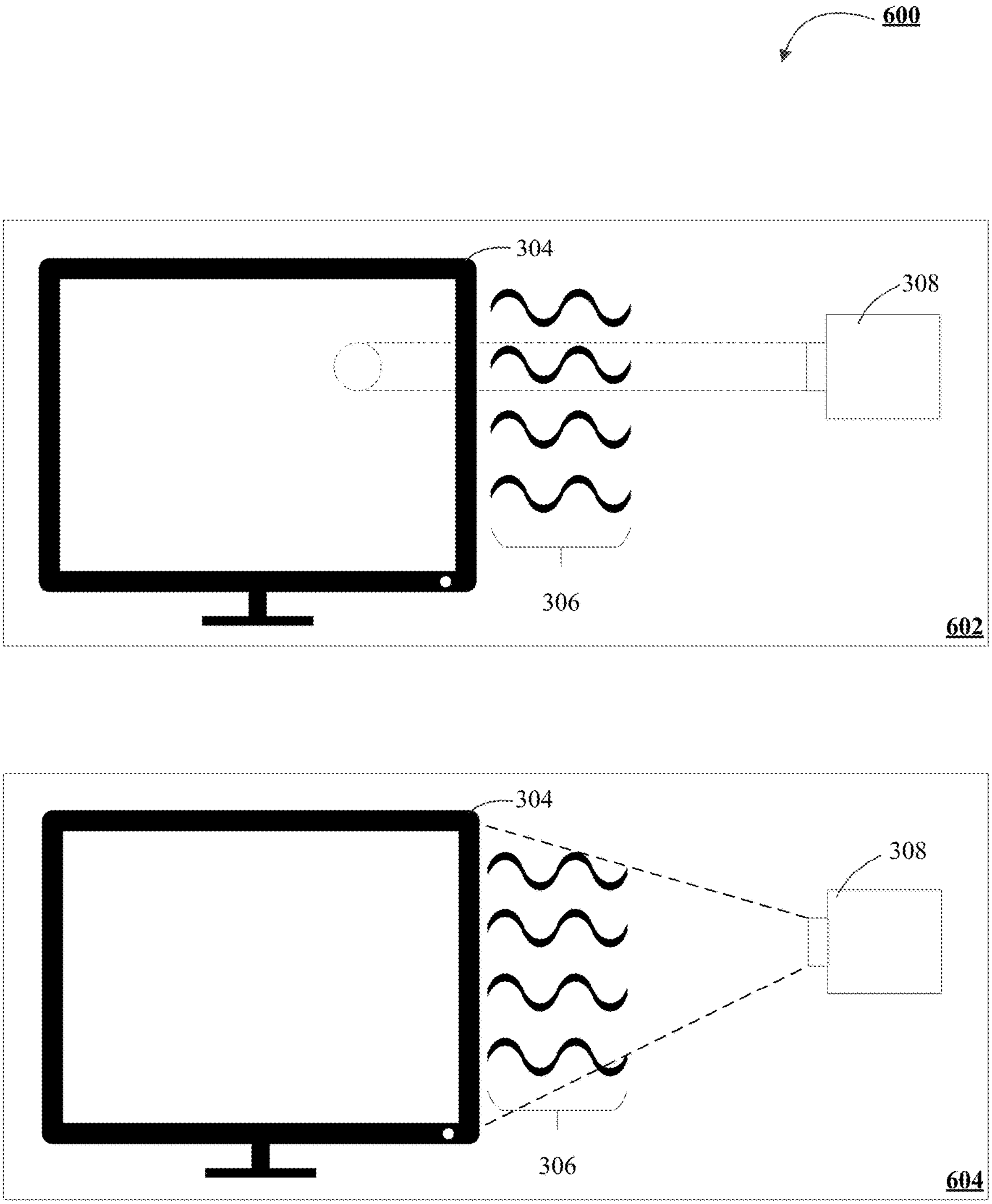
Figure 7:
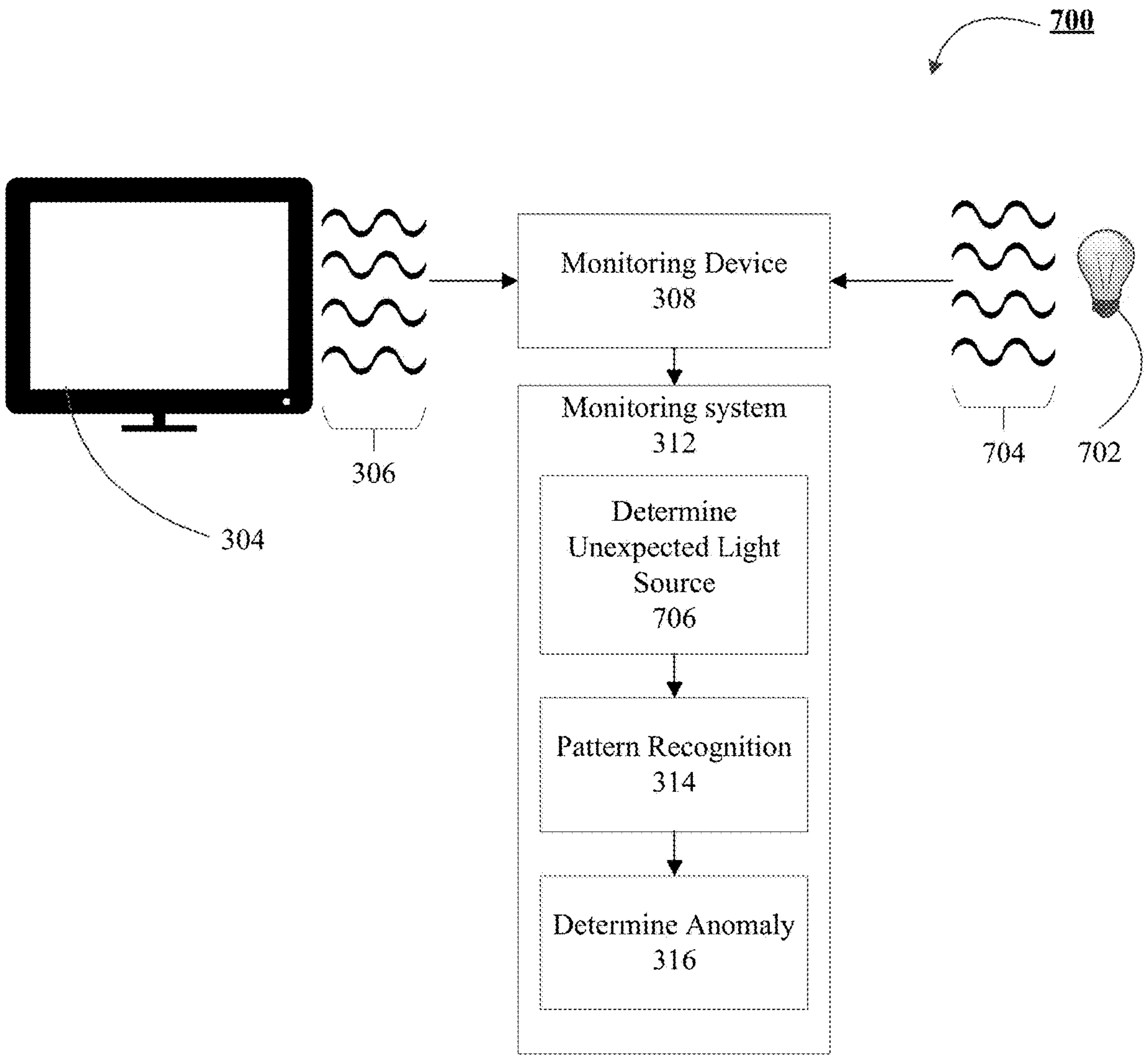
Figure 8:
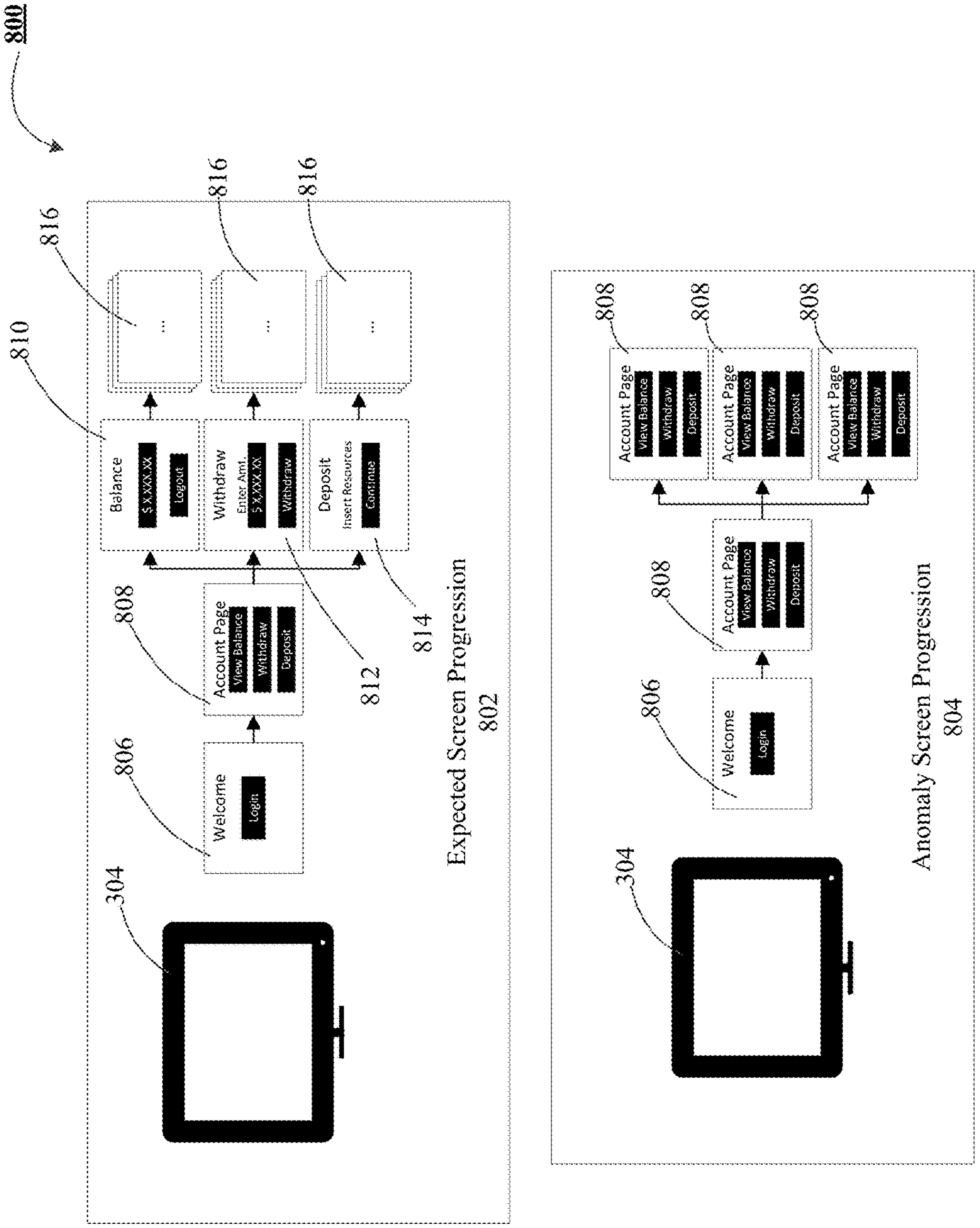
Figure 9:
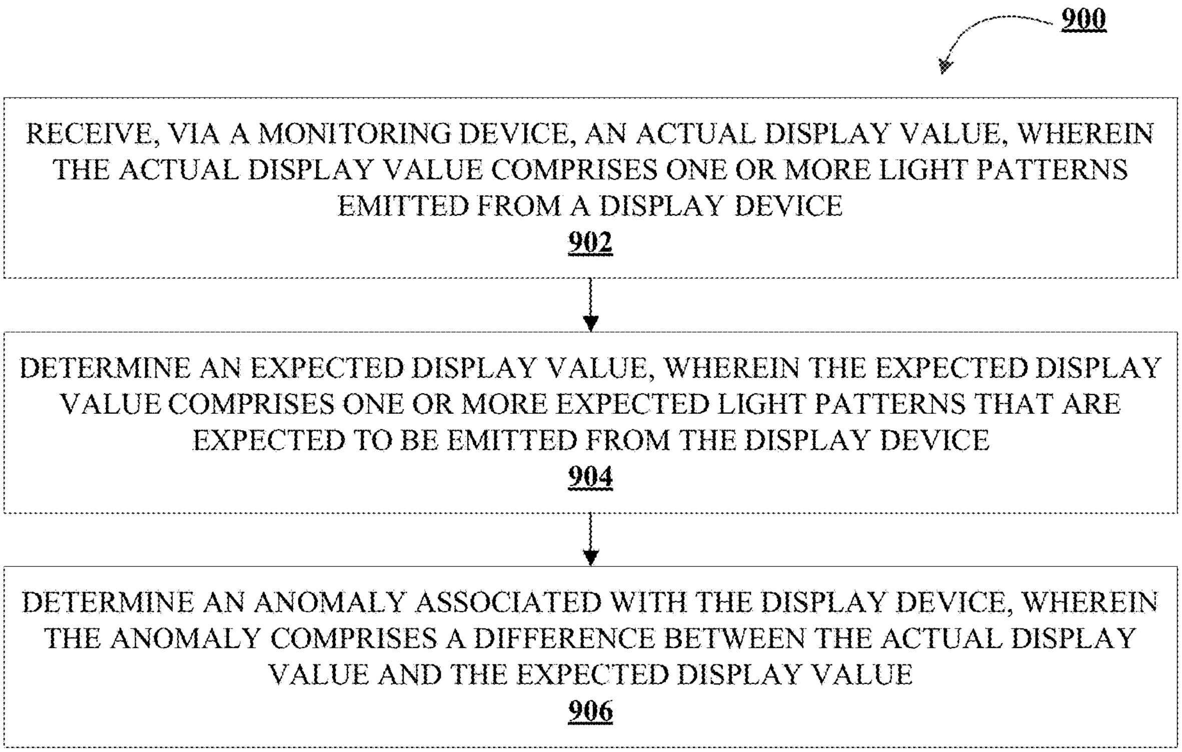

FIGS. 1A-1C illustrates technical components of an exemplary distributed computing environment for determining device output using photoelectric devices, in accordance with an embodiment of the disclosure;

FIG. 2 illustrates an exemplary generative AI subsystem, in accordance with an embodiment of the disclosure;

FIG. 3 illustrates an example configuration of a first platform and a second platform, in accordance with an embodiment of the disclosure;

FIG. 4 illustrates an example of data associated with one or more light patterns emitted by a display device, in accordance with an embodiment of the disclosure;

FIG. 5 illustrates example configurations of a monitoring device coupled to a display device, in accordance with an embodiment of the disclosure;

FIG. 6 illustrates example configurations of the monitoring device viewing the display device from a distance, in accordance with an embodiment of the disclosure;

FIG. 7 illustrates an additional light source producing one or more unexpected light patterns being received by the monitoring device, in accordance with an embodiment of the disclosure;

FIG. 8 illustrates an example configuration of an expected screen progression an anomaly screen progression, in accordance with an embodiment of the disclosure; and FIG. 9 illustrates a process flow for determining device output using photoelectric devices, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "photoelectric device" may be any device that detects a presence of light. The presence of light may include any light having any wavelength, which may include visible light, infrared light, ultraviolet light, or the like. The photoelectric device may generate an electrical signal in response to detecting the light. Further, the photoelectric device may detect changes in light, which may alter the electrical signal produced by the device. For instance, a steady state visible light pattern may be detected by the photoelectric device, as well as a change in the intensity of the light pattern. Further, the photoelectric device may detect the change in color, tone (e.g., color tone), brightness, and the like of the light pattern.

In modern computing environments, devices may be configured to operate autonomously or without support from a technician. These autonomous devices may include standalone devices that have their own hardware and software and are configured to operate with little to no involvement from an installation team, support team, maintenance team, or the like. Further, the devices may be used by the general public in some instances, which may necessitate the integration of robust systems that maintain the device during operation. For example, these devices may include automated teller machines (ATMs), electronic billboards, kiosks, advertisement displays, or the like. The devices are meant to be used, interacted with, or viewed by users of the general public. Further, the devices, once installed and set up, are designed to operate in an independent manner. However, conventional designs of such devices may not allow for detection of anomalies that happen during operation. An anomaly may include the device freezing, getting stuck in a software loop, the display dimming or experiencing a fault, or any failure of operation that is unexpected and may affect a user's experience during their interaction with the device. Conventional systems may only detect some of the faults by determining interactions during a specified timeframe are lower than expected (e.g., users have not used the device within a 24-hour window, indicating something is wrong with the device). However, these anomaly detection methods are slow, inconvenient, inefficient, and often may not detect the anomaly in a timely fashion. Additional problems arise when conventional detection procedures are tied to the function of the device associated with the anomaly. For example, a conventional detection method may run anomaly detection software using the device's own operating system. When the device experiences an anomaly (e.g., an operation fault or failure), the anomaly detection software will also fail, eliminating the benefit of the software. Therefore, systems and methods for determining device output using photoelectric devices are introduced.

The solution as described in the present disclosure may include detecting light patterns emitted from a display device via a monitoring device. The monitoring device may, in some embodiments, be integrated into the display device, which may include sharing the BIOS environment of the display device. Using the BIOS of the display device may simplify the system by eliminating the need for redundant hardware and circuitry without comprising on the ability for the system to function in the event of an anomaly of the display device. In other embodiments, the system may be associated with a separate platform that includes its own hardware and software, increasing the system's resilience against anomalies experienced by the display device.

After the monitoring device receives actual display values from the display device, it may compare them against expected display values. Anomalies may be detected when the actual display value is different than an expected display value, which may include the display device freezing on a certain screen, dimming, faulting out, or the like. Further, the expected display values may be determined by an AI engine trained on an expected screen progression of the display device. In this way, the AI engine may be trained on all possible variations of the display device's screen progressions so the AI engine understands the expected screen progressions. Further, anomalies may be detected when the actual display values do not match expected display values, which may include actual screen progressions not matching expected screen progressions.

What is more, the present disclosure provides a technical solution to a technical problem. As described herein, the technical problem includes anomaly detection procedures for when actual display values vary from expected display values. The technical solution presented herein allows for determination of an anomaly associated with a display device via a monitoring device and/or a monitoring system. In particular, the system 130 as described herein is an improvement over existing solutions to the issue of anomaly detection, (i) with fewer steps to achieve the solution, thus reducing the amount of computing resources, such as processing resources, storage resources, network resources, and/or the like, that are being used (e.g., by automating the process of monitoring, detecting, and determining anomalies associated with a display device), (ii) providing a more accurate solution to problem, thus reducing the number of resources required to remedy any errors made due to a less accurate solution (e.g., by determining anomalies in real time through the use of monitoring device(s)), (iii) removing manual input and waste from the implementation of the solution, thus improving speed and efficiency of the process and conserving computing resources (e.g., by using automated systems and processes, such as an AI engine, that is used to continuously monitor a display device for anomalies), (iv) determining an optimal amount of resources that need to be used to implement the solution, thus reducing network traffic and load on existing computing resources (e.g., by eliminating wasted resources associated with display devices having an anomaly for longer than they should). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for determining device output using photoelectric devices, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer-or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 illustrates an exemplary generative AI subsystem 200, in accordance with an embodiment of the invention. The generative AI subsystem 200 may include a data ingestion engine 202, a data pre-processing engine 204, and a model training engine 206. It should be understood that the generative AI subsystem 200 is merely an example, and other embodiments may include more, fewer, or different components depending on the specific requirements and implementations of the system. For instance, additional engines for data validation, feature selection, or distributed computing may be integrated into the subsystem, or certain components described herein may be consolidated or omitted based on system performance objectives. Therefore, the generative AI subsystem 200 should not be considered limiting and may be adapted to various configurations within the scope of the invention.

The data ingestion engine 202 may identify various internal and/or external data sources to generate, test, and/or integrate new features for training the generative AI model. These internal and/or external data sources (e.g., text corpora, web-based text data, document repositories, or decentralized text storage system) may be initial locations where the data originates or where physical information is first digitized. In addition to conventional data sources, the data ingestion engine 202 may support decentralized storage systems, such as blockchain-based data sources, and privacy-preserving methods such as differential privacy. The data ingestion engine 202 may identify the location of the data and describe connection characteristics for access and retrieval of data. In some embodiments, data is transported from each data source using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like.

Depending on the nature of the data, the data ingestion engine 202 may move the data to a destination for storage or further analysis. Typically, the data may be in varying formats as they come from different sources, including RDBMS, other types of databases, S3 buckets, CSVs, or from streams. For a large language model ("LLM"), text data may originate from sources such as web scrapes, social media, large public text datasets, or the like. Since the data comes from different places, it needs to be cleansed and transformed so that it can be analyzed together with data from other sources. The data may be ingested in real-time, using stream processing, in batches using a batch data warehouse, or a combination of both. Stream processing may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse collects and transfers data in batches according to scheduled intervals, trigger events, or any other logical ordering.

In machine learning, the quality of data and the useful information that can be derived therefrom directly affects the ability of the machine learning model to learn. The data pre-processing engine 204 may implement advanced integration and processing steps needed to prepare the data for machine learning execution, including tokenization, text normalization, and removal of irrelevant elements like HTML tags in web-based data, especially for LLM training. This may include modules to perform any upfront, data transformation to consolidate the data into alternate forms by changing the value, structure, or format of the data using generalization, normalization, attribute selection, and aggregation, text-specific transformations such as stemming and lemmatization, data cleaning by filling missing values, smoothing the noisy data, resolving the inconsistency, and removing outliers, and/or any other encoding steps as needed. In some embodiments, the data pre-processing engine 204 may perform real-time pre-processing at the edge via edge computing devices, allowing for the transformation and reduction of data prior to transmission to centralized locations, thereby reducing latency and conserving network bandwidth.

In addition to improving the quality of the data, the data pre-processing engine 204 may transform categorical data into numerical formats that are suitable for machine learning algorithms. In this regard, the data pre-processing engine 204 may use techniques such as one-hot encoding or label encoding depending on the nature of the categorical variables and the intended use of the data.

In some embodiments, the data pre-processing engine 204 may also include dimensionality reduction techniques, where the number of input features is reduced while retaining the most relevant information. In this regard, the data pre-processing engine 204 may include methods such as Principal Component Analysis (PCA) or apply feature selection algorithms to remove redundant or irrelevant features, thereby reducing the computational complexity of the model training phase. Feature selection may be particularly beneficial in datasets with a high number of features, ensuring that the generative AI models do not overfit to noise or irrelevant details. The pre-processed data output from the data pre-processing engine 204 may then be fed into the model training module 206.

The model training engine 206 may be responsible for training the generative AI models using the pre-processed data from the data pre-processing engine 204. The model training engine 206 may implement various machine learning algorithms, including but not limited to Generative Adversarial Networks (GANs), Variational Autoencoders (VAEs), transformers, diffusion models, or other specialized architectures depending on the specific requirements of the system. These models may be used in a broad range of applications, such as LLMs for text generation, image generation models, video synthesis models, audio generation models, and/or the like. The model training engine 206 may optimize these models by continuously adjusting their internal parameters based on the patterns and relationships identified within the data.

In some embodiments, the model training engine 206 may include a training data handler, which manages the partitioning of the pre-processed data into training, validation, and testing datasets. The training data is used to update the model's parameters, while the validation and testing datasets are reserved to evaluate the model's performance during and after training. The model training engine 206 may support various data-handling strategies, such as cross-validation or random shuffling, to ensure that the model generalizes well and is not overfitting to the training data.

In embodiments involving large language models, the model training engine 206 may utilize transformer-based architectures, such as the Transformer, BERT, GPT, or the like. Transformer models rely on mechanisms like self-attention to capture dependencies between words in a sequence, regardless of their distance from one another. The self-attention mechanism allows the model to weigh the importance of different words in a sentence and establish complex relationships important for understanding context. During training, the model may process vast amounts of text data and learn to predict the next word or token in a sequence based on the input context. This training process allows LLMs to generate coherent text, complete sentences, translate languages, or answer questions based on learned patterns from the data.

The transformer-based LLMs may be trained using autoregressive (e.g., GPT) or masked-language modeling techniques (e.g., BERT). In autoregressive models, the training process may include predicting the next word in a sequence by progressively revealing more context to the model. The model iteratively improves its predictions based on its performance during prior iterations. Masked-language modeling involves masking certain words in a sentence and training the model to correctly predict the masked words based on surrounding context. Both approaches enable LLMs to capture intricate patterns in human language, improving their ability to handle tasks such as summarization, translation, and text generation. Loss functions like cross-entropy loss may be used to optimize the model's performance by comparing predicted tokens with the actual tokens in the dataset to guide the model to minimize prediction errors during training, as described in further detail herein.

In embodiments involving image generation models, the model training engine 206 may utilize transformer-based architectures, such as Vision Transformers (ViTs) or generative adversarial networks (GANs). Vision Transformers rely on self-attention mechanisms to process images as sequences of patches rather than whole images, allowing the model to capture spatial dependencies and patterns across the image. During training, the model may be exposed to large datasets containing diverse image types to learn features like textures, edges, and shapes. The model may then generate or reconstruct images by interpreting these patterns and applying learned spatial relationships. GAN-based models may also be used, where a generator network creates images, and a determinator network evaluates their realism, enabling the model to improve through adversarial training.

Image generation models may employ various training techniques, such as pixel-wise reconstruction or adversarial training, depending on the architecture. Pixel-wise reconstruction methods involve learning to reconstruct an image from its corrupted or downscaled version, optimizing the model to minimize the difference between the predicted and actual pixels (e.g., using mean squared error as the loss function). Adversarial training, often used with GANs, involves iteratively improving the generator network to produce images that are increasingly indistinguishable from real images, based on feedback from the determinator network. These approaches allow the model to capture complex visual features, enabling applications such as image synthesis, enhancement, and style transfer.

For video generation models, the model training engine 206 may employ transformer-based architectures like Video Transformers or GAN-based models specifically designed for handling temporal sequences. Video Transformers use self-attention mechanisms to model dependencies not only between pixels within a single frame but also across frames, allowing them to understand temporal relationships and motion patterns in videos. The model may be trained on large video datasets, enabling it to learn and reproduce dynamic changes and interactions between objects over time. GAN-based video models may incorporate spatiotemporal networks to evaluate the realism of generated video sequences, optimizing the model to produce continuous and coherent frames.

Video generation models may utilize spatial-temporal modeling techniques or adversarial training for generating realistic motion and video sequences. Spatial-temporal modeling involves learning the spatial features within each frame while simultaneously capturing the temporal dependencies between frames, optimizing the model's ability to predict future frames or complete missing sequences. Loss functions like mean squared error or perceptual loss may be applied to reduce discrepancies between predicted and actual frames. Adversarial training, on the other hand, may involve a generator creating video sequences and a determinator evaluating their realism, encouraging the generator to improve by minimizing the discrepancy identified by the determinator. These techniques may enable video generation models to create coherent and realistic sequences, useful in applications such as video synthesis and animation.

In audio generation models, the model training engine 206 may utilize architectures such as Audio Transformers or recurrent neural networks (RNNs) like WaveNet, designed to handle sequential and waveform data. Audio Transformers leverage attention mechanisms to capture relationships between segments of audio, allowing them to model temporal dependencies and predict the next audio sample based on previous context. During training, the model may process large audio datasets containing diverse sound patterns to learn representations of different audio features, such as frequency, amplitude, and harmonics. This training enables the model to generate coherent audio sequences, including speech, music, or ambient sounds, by synthesizing these learned patterns.

Audio generation models may be trained using sequence modeling techniques or autoregressive methods, depending on the architecture. Sequence modeling techniques involve processing and predicting sequences of audio samples, optimizing the model to capture and reproduce temporal dependencies in sound. Autoregressive methods, such as those employed in WaveNet, focus on predicting each audio sample based on prior samples, progressively refining the generated audio sequence over multiple iterations. Loss functions like mean absolute error or cross-entropy loss may be used to minimize the error between predicted and actual audio samples, guiding the model to improve its accuracy. These approaches allow audio generation models to create continuous and realistic audio outputs, applicable in areas such as speech synthesis, music generation, and sound effect creation.

The reconstruction loss ensures that the difference between the original input and the reconstructed output is minimized, guiding the decoder to generate outputs that closely resemble the input data. The second component, KL divergence loss, regularizes the latent space by ensuring that the distribution of latent variables conforms to a predefined probabilistic distribution, often a Gaussian distribution. This constraint encourages the model to learn a well-organized and smooth latent space, allowing for meaningful sampling from this space during inference. By combining these loss functions, the VAE can learn a latent space that not only captures the underlying patterns in the data but also allows for the generation of novel outputs by sampling new points from this space. During the inference phase, the trained model can sample random points from the latent space to generate new, previously unseen data instances.

In training generative AI models, the model training engine 206, which includes an optimization module 208, may implement various optimization techniques to improve model performance and efficiency. The optimization module 208 is responsible for adjusting the model's internal parameters continuously, using feedback from relevant loss functions tailored to the application (e.g., text, image, audio, or video generation). Techniques such as gradient clipping, learning rate scheduling, and mixed-precision training are applied by the optimization module 208 to stabilize and fine-tune the training process. Gradient clipping may be used to stabilize the training process, especially in transformer-based models, by capping the magnitude of gradients to prevent them from becoming excessively large. Learning rate scheduling may involve gradually increasing the learning rate during initial training phases (warm-up) and then decaying it as training progresses to fine-tune the model's parameters more effectively. Mixed-precision training, which leverages lower-precision (e.g., float16) arithmetic while retaining higher precision (e.g., float32) for specific calculations, may be used to accelerate training and reduce memory consumption, enabling the model to scale efficiently even when trained on large datasets.

In some embodiments, the model training engine 206 may implement early stopping mechanisms to prevent overfitting. Early stopping monitors the generative AI model's performance on the validation dataset, halting the training process if the performance does not improve after a specified number of iterations. This ensures that the generative AI model does not continue training on noise or irrelevant patterns, which could degrade its performance on unseen data. The model training engine 206 may also support distributed training across multiple computing nodes, allowing the system to scale its computational resources as needed. Distributed training may involve splitting the generative AI model and data across multiple machines or GPUs, where each node processes a portion of the data and updates the model in parallel. This is particularly useful for large datasets or models that require significant computational power, such as deep generative models. The model training engine 206 may synchronize the updates across the nodes using techniques like synchronous or asynchronous gradient descent.

Once the generative AI model is trained, the model training engine 206 may save the final trained generative AI model in a persistent storage location for future use. In specific embodiments, metadata such as the number of epochs, the final loss values, and values of learned parameters may be logged for model versioning and/or retraining at a later stage. In some embodiments, the model training engine 206 may also implement transfer learning, where a pre-trained model is fine-tuned on a smaller, domain-specific dataset. This may reduce the amount of time and data required to train a new model, especially in cases where the available data is limited or highly specialized. The model training engine 206 may adjust the parameters of the pre-trained model to better align with the new dataset, while preserving the learned features from the original training.

In embodiments involving LLMs, new output is generated by sampling from the model's probability distribution of tokens, conditioned on the context provided as input. Transformer-based architectures, such as GPT, use an auto-regressive approach where the model predicts the next token in a sequence one step at a time, using previously generated tokens as input for subsequent predictions. The process starts with a prompt or an initial sequence of words, and the model iteratively generates new tokens, forming coherent sentences or paragraphs based on the learned context and language patterns. For masked-language modeling (e.g., BERT), new output may be generated by filling in masked parts of the input sequence, allowing the model to complete sentences or generate variations of the provided text. The generated output can be controlled by adjusting parameters, which influences the randomness of the token sampling, enabling the generation of diverse or deterministic responses.

In image generation models, such as those using ViTs or GANs, new output is generated by sampling from the learned distribution in the model's latent space. For GANs, the generator network creates an image by transforming random noise vectors into structured image outputs through a series of layers that learn visual features like shapes, textures, and colors. The generated image is then refined through adversarial feedback from the determinator network, which assesses the realism of the generated output. For transformer-based image models, the process may involve reconstructing images by assembling patches based on the learned dependencies between them. Input conditions, such as prompts describing desired features or specific noise vectors, guide the generation process, allowing for the creation of customized images or variations of existing visual styles. These models may also generate images based on style transfer techniques or predefined templates, synthesizing images that align with the characteristics present in the training data.

Video generation models utilize spatiotemporal dependencies to synthesize new video sequences based on the patterns learned during training. In transformer-based architectures, the model may generate video frames sequentially, predicting the next frame based on the input frames and the temporal context established by prior frames. GAN-based models, specifically designed for video synthesis, may sample noise vectors or use a sequence of frames as input, transforming these into continuous and temporally coherent video outputs through the generator network. The determinator evaluates the temporal consistency and realism of the output, ensuring the generated video mimics the motion dynamics and object interactions present in real-world video data. Such models may also use attention mechanisms to focus on critical elements within each frame and their evolution across time, facilitating realistic scene transitions and motion patterns. The generation process may include user-defined input such as initial frames, motion descriptions, or specific video attributes, providing control over the output.

Audio generation models, including Audio Transformers or autoregressive architectures like WaveNet, generate new audio sequences by predicting audio samples based on learned dependencies in sequential sound data. For autoregressive models, the generation process involves producing each audio sample one at a time, conditioned on previously generated samples, allowing the model to build complex audio patterns such as speech, music, or ambient sounds. The model starts with an initial segment or a random seed and uses its learned parameters to predict and synthesize subsequent samples, constructing a continuous audio waveform. Audio Transformers, on the other hand, may use attention mechanisms to identify important temporal segments within the input audio and synthesize new output based on these learned patterns. The user can control the type of audio generated by providing parameters such as pitch, tempo, or initial sound clips, enabling the model to generate outputs tailored to specific use cases like speech synthesis, music composition, or environmental sound generation.

In some embodiments, generative AI models may also integrate multiple modalities, enabling cross-modal generation where output in one modality influences or conditions the generation in another. For example, a video generation model may use text descriptions as input, synthesizing video content that aligns with the specified narrative or visual scene described. Similarly, image generation models may generate visual representations based on audio inputs, such as generating animations synchronized to musical rhythms or speech patterns. These cross-modal systems typically involve conditional GANs or multi-modal transformers, where the model processes input from one domain (e.g., text or audio) and learns to generate output in another domain (e.g., video or image) by aligning the patterns and dependencies between the different modalities. These models may allow users to generate complex, multimodal content based on combinations of inputs, such as using textual prompts to control the visual and auditory elements of a video.

It will be understood that the embodiment of the generative AI subsystem 200 illustrated in FIG. 2 is exemplary and that other embodiments may vary. The generative AI subsystem 200, as well as its constituent elements, may vary, and modifications or alternative configurations may be implemented without departing from the broader scope of the invention. For instance, different machine learning algorithms, data sources, optimization techniques, or training methodologies may be employed depending on system requirements, application domain, and available computational resources. Furthermore, features and functionalities described in one embodiment may be combined with those of another embodiment as needed, and vice versa.

In some embodiments, the system 130 as described herein may include receiving, via a monitoring device, an actual display value, wherein the actual display value includes one or more light patterns emitted from a display device. Further, in some embodiments, the system 130 may determine an expected display value, wherein the expected display value includes one or more expected light patterns that are expected to be emitted from the display device. Further, in some embodiments, the system 130 may determine an anomaly associated with the display device, wherein the anomaly includes a difference between the actual display value and the expected display value.

In some embodiments, the display device may be associated with a first platform and the monitoring device may be associated with a second platform. As shown in FIG. 3, the display device 304 may be associated with a first platform 302. The first platform 302 may include devices, components, hardware, software, or the like used to operate the display device 304. In this way, the first platform 302 may be computing hardware and software associated with the display device 304. For example, the first platform 302 may have a Basic Input/Output System (BIOS) (e.g., BIOS 320), a central processing unit (CPU), graphics processing unit (GPU), memory, storage device, communications circuitry, and/or the like (not shown) used to operate the display device 304. In this regard, the first platform 302 may include at least a portion of a computing environment used to operate the display device 304. Further, in some embodiments, the first platform 302 and the display device 304 may be integrated into a single device (e.g., a tablet, a computer, an ATM, a kiosk, a billboard, etc.) wherein the display device 304 is communicatively coupled to the first platform 302. Further, in other embodiments, the display device 304 and the first platform 302 may be communicatively coupled via wired or wireless connection(s). In this regard, the display device 304 and the first platform 302 may be physically connected or physically separated.

Further, the second platform 318 may include the system 130, the monitoring device 308, a monitoring relay device, the monitoring system 312, and the associated functions of those components (e.g., pattern recognition 314 and/or anomaly determination 316). In some embodiments, the second platform 318 may include computing components required to operate the second platform 318 independently from the first platform 302. In this way, and in some embodiments, the second platform 318 may be independent of the first platform 302. For example, the second platform 318 may include its own hardware and software used to operate the device output determination system 130 associated with the second platform. In this example, and in some embodiments, the second platform 318 may include its own BIOS 322 which may be used to operate the system 130, the monitoring device 308, the monitoring system 312, or the like.

Further, in some embodiments, the second platform 318 and the first platform 302 may share some or all of the hardware and software. In this way, the second platform 318 may use some or all of the components, hardware, and/or software used by the first platform 302. For example, in some embodiments, the second platform 318 may run within a nonstop BIOS environment using the BIOS 320 associated with the first platform 302. In this way, the BIOS 320 may provide essential functionalities associated with the first platform 302 and may also provide essential functionalities to the second platform 318. In this regard, the BIOS 320 may be shared between the first platform 302 and the second platform 318 and may be configured to run and operate the display device 304, the system 130, or the like.

In some embodiments, the second platform 318 may be functional in an instance in which the first platform 302 experiences the anomaly associated with the display device 304. The anomaly may be an issue, bug, malfunction, error, or the like that causes the display device 304 to operate differently than an expected operation. For example, the anomaly may affect the brightness of the display device 304 or may cause the display device 304 to freeze. In this way, and in some embodiments, the anomaly may be such that it affects the output of the display device 304. Further, the anomaly may affect the first platform 302 in such a way as to not affect the BIOS 320 of the first platform 302. For example, the anomaly may only affect the display device 304 without affecting the functionalities of the other parts of the first platform 302 (e.g., the BIOS 320).

In this regard, and in embodiments where the BIOS 320 is between the first platform 302 and the second platform 318, the display device 304 may be affected by the anomaly but the BIOS 320 may keep operating. Further, in some embodiments, the second platform's 318 operations may remain unaffected during the display device's 304 failure because the BIOS 320 remains functional. In this way, and in some embodiments, the anomaly associated with the display device 304 of the first platform 302 may not affect the device output determination system 130 of the second platform 318.

Further, in other embodiments, the second platform 318 may be an independent system that operates separately from the first platform 302. In this way, the second platform 318 may be a standalone system that does not share hardware or software with the first platform 302. In this way, the failures or outages of the hardware or software of the first platform 302 may not affect the second platform 318 and the operations of the device output determination system 130. In some embodiments, for example, an anomaly associated with the display device 304 of the first platform 302 (which also may affect BIOS 320) may not affect the device output determination system 130 of the second platform 318. Additionally, or alternatively, in some embodiments and as shown in FIG. 3, the second platform 318 may include its own BIOS 322 that may provide the necessary functionalities to operate the device output determination system 130. In this way, the system 130 associated with the second platform 318 may be unaffected by anomalies and/or outages of the first platform 302 because the BIOS 322 of the second platform 318 remains functional.

In some embodiments, the actual display value may include at least one of lumen data, kelvin data, and/or color data. In some embodiments, the lumen data may include a brightness of the one or more light patterns. In some embodiments, the lumen data may indicate the brightness, intensity, or the like of the one or more light patterns. In some embodiments, the kelvin data may include a color degree of the one or more light patterns. In some embodiments, the kelvin data may indicate the color degree such as a warmer color light pattern or a cooler color light pattern. In some embodiments, the color data may include a color of the one or more light patterns. In this way, the color data may indicate the color of the light pattern.

In some embodiments, the monitoring device may include a photoelectric device configured to generate, based on the one or more light patterns, at least one of a lumen value, a kelvin value, or a color value. In some embodiments, the lumen value, kelvin value, and color value may be representative of the lumen data, kelvin data, and color data, respectively. For example, the lumen value generated based on the light patterns may be representative of the lumen data of the light patterns. In another example, the kelvin value may be representative of the kelvin data, and the color value may be representative of the color data.

In some embodiments, and as shown in FIG. 4, the display device 304 may contain one or more pixels, which may include one or more subpixels (e.g., 406, 410, 414) used to create the one or more light patterns 306. In some embodiments, the pixels may generate a light pattern 306 that includes the lumen value, the kelvin value, and/or the color value. In some embodiments, the monitoring device 308 may receive and/or detect the light patterns 306 emitted by the pixels of the display device 304. In some embodiments, the lumen value may be associated with an intensity of the light patterns 306. In some embodiments, the kelvin value and the color value may be associated with the wavelength of the light patterns 306.

As an example, and as shown in FIG. 4, a first subpixel 406 may generate at least a portion of one or more light patterns 306. In situations where an anomaly is present, the first subpixel 406 may generate the light pattern 306 with actual display values 416 different than the expected display values 418, which may include an actual wavelength less than an expected wavelength and/or an actual intensity less than an expected intensity. In this example, the wavelength difference 404 may include a difference in color between the actual display value 416 and the expected display value 418. Further, in some embodiments, the anomaly may include the lumen value associated with the actual display value being less than an expected lumen value associated with the expected display value. In this way, the intensity difference 402 may include a difference between the actual brightness produced by the subpixel 406 and the expected brightness of the subpixel 406.

In some embodiments, the monitoring system 312, the monitoring device 308, the system 130, the AI engine, or the like may determine the difference between the actual display values 416 and the expected display values 418 using a variety of calculations. For example, the intensity difference 402 between the actual display value 416 and the expected display value 418 may be due to the display device 304 dimming, freezing, shutting down, or the like. In this way, the intensity difference 402 may be determined to be significant enough to make a determination that an anomaly exists. In some embodiments, the intensity difference 402 may fall outside of an acceptable difference threshold. In this way, the threshold may indicate a range of values (e.g., intensity or lumen values) that are deemed acceptable by the system 130 for the actual display values 416 to fall within. In other words, and in some embodiments, if the actual display values 416 fall within the acceptable difference threshold, an anomaly may not be determined. If, in other embodiments, the actual display values 416 fall outside of the acceptable difference threshold, the anomaly may be determined to exist. In some embodiments, the acceptable difference threshold may take into consideration environmental factors such as the weather, time of day, glares, other light sources, or the like. For example, the system 130 may take into consideration direct sunlight that may alter the measuring device's 308 reading of the actual display values 416. In this example, direct sunlight may have an effect of "washing out" or falsely lowering or raising the actual display value 416 intensity measurement emitted by the display device 304. In this way, and in some embodiments, the system 130 may offset the factors that may falsely affect the measuring device's 308 readings of the light patterns 306.

Additionally, or alternatively, and in some embodiments, the wavelength difference 404 may also have an acceptable threshold difference, indicating the allowable range for color variations or tone color variations of the actual display values 416. For example, the wavelength difference 404 between the actual display value 416 and the expected display value 418 may, in some cases, be outside of the acceptable difference threshold, which would indicate that an anomaly exists. In this way, for instance, the anomaly associated with the display device 304 may affect the color-generating components of the display device 304. For example, damage to the display device 304 may have affected the color filter layer's 512 ability to properly filter the colors throughout the display device 304. The anomaly may be detected due to the measuring device 308 detecting the difference in the wavelength 404 between the actual display values 416 and the expected display values 418.

Further, the monitoring device 308 may receive the actual display values 416. In this regard, the monitoring device 308 may receive the actual display values 416 produced by the first, second, or third subpixel(s) 406, 410, 414. In some embodiments, the monitoring device 308 may determine the differences in intensity and wavelength for the pixel, which may include the differences as discussed above for each of the subpixels (e.g., 406, 410, and 414). In this way, and in some embodiments, the monitoring device 308 may receive the light patterns 306 from each pixel or subpixel of the display device 304.

Further, in some embodiments, the monitoring device 308 may include components and/or devices used to process the actual display values 416 and compare them against the expected display values 418. In some embodiments, the monitoring device 308 may be equipped with hardware, software, circuitry and the like used to determine a difference (e.g., an anomaly) between the actual and expected display values.

Further, in some embodiments, the monitoring system 312 may determine the difference between the actual display values 416 and the expected display values 418. In this way, the monitoring system 312 may determine the anomaly. For example, the monitoring system may compare the actual display values 416 against the expected display values 418 to determine if an anomaly is present. In some embodiments, the monitoring system 312 may include components, software, and/or hardware used to detect, determine, and process the anomaly associated with the display device 304. In this way, the monitoring system 312 may receive the data generated by the monitoring device 308 based on the one or more light patterns 306 emitted from the display device 304. Further, the monitoring system 312 may process the data to determine if an anomaly is present.

In some embodiments, the monitoring device may be operatively coupled to the display device. FIG. 5 illustrates an exploded view of a display device 304, which may include one or more components to produce an image on the display device 304 via the one or more light patterns 306. It is to be understood that FIG. 5 illustrates an example embodiment of a display device 304 and does not limit the configurations and/or embodiments of other display devices 304 that may be used herein. For clarification, the embodiment as illustrated in FIG. 5 is for example and explanation purposes only.

In some embodiments, the display device 304 may include a variety of layers, including a backlight layer 502, one or more diffusor layers 504, a vertical polarizing film layer 506, a thin film transistor (TFT) layer 508, a liquid crystal layer 510, a color filter layer 512, a horizontal polarizing film layer 514, and a front layer 516. In some embodiments, the measuring device 308 may be positioned in front of, behind, or in between any of the layers (e.g., 502-516). In preferred embodiments, the monitoring device 308 may be positioned in front of the front layer 516 so as to capture the light patterns 306 as they are emitted from the display device 304.

In other embodiments, the monitoring device 308 may be physically separated from the display device 304. In this way, the monitoring device 308 may be configured to view the front layer 516 of the display device 304 from a distance. For example, as shown in FIG. 6, the monitoring device 308 may view the display device 304 from a distance. In this way, the monitoring device 308 may be positioned at any distance away from the display device 304.

Further, in some embodiments, the monitoring device 308 may be a device included in another system, such as a security system that may be monitoring the display device 304. In this regard, the monitoring device 308 may be a security camera, for example, that is used to monitor the area surrounding the display device 304. The monitoring device 308 may be configured to view the display device 304 and transmit the data received to the system 130 for further processing.

In a specific example, the display device 304 may the display of an ATM and the monitoring device 308 may be a security camera monitoring the ATM and surrounding area. In this regard, the security camera (e.g., the monitoring device 308) may be positioned to view the ATM (e.g., the display device 304). In this example, the monitoring device 308 (e.g., the security camera, in this example) may then be used by the system 130 to monitor the display device 304 (e.g., the ATM) for anomalies.

In some embodiments, the monitoring device may receive the actual display value associated with the one or more light patterns emitted from at least a portion of the display device. In this way, the monitoring device 308 may configured to receive the light patterns 306 emitted from at least a portion of the display device 304. In some embodiments, the monitoring device 308 may be configured to capture a range, an area, or a specified number of pixels of the display device 304. For example, a monitoring device 308 may be configured to receive the light patterns 306 of the pixels adjacent or close to the monitoring device 308, which may include an outside edge of pixels of the display device. In another example, the monitoring device 308 may be focused or otherwise positioned to receive light patterns 306 emitted from a specified area of the display device 304, as shown in block 602 of FIG. 6.

In some embodiments, the monitoring device may receive the actual display value associated with the one or more light patterns emitted from the entire display device. In some embodiments, the monitoring device 308 may be configured to capture the entirety of the light patterns 306 emitted from the display device 304. In this regard, the monitoring device 308 may be able to fully view the image the display device 304 is displaying. For instance, the monitoring device 308 may have an unobstructed view of the entire front layer (e.g., front layer 516 as shown in FIG. 5) of the display device 304.

In embodiments where the monitoring device 308 is integrated into the display device 304, the monitoring device 308 capturing the entirety of the image of the display device 304 may include using one or more monitoring devices 308 to receive the light patterns 306. For example, multiple monitoring devices 308 may be positioned around the display device 304 so as to capture individual portions of the light patterns 306. Further, the system 130 may then aggregate or combine the actual display values 416 from each of the monitoring devices 308 to create a single image that represents the entirety of the display device 304.

Further, block 604 of FIG. 6 illustrates a monitoring device 308 configured to capture the entirety of the light patterns 306 emitted by the display device 304. In this way, and similar to the configuration mentioned above, the monitoring device 308 may be positioned at a distance away from the display device 304 and capture (e.g., receive) the light patterns 306 emitted from the display device 304.

In some embodiments, an AI engine may be configured to determine the expected display value in real time, wherein the AI engine is trained on baseline parameters associated with the expected display value. In some embodiments, the AI engine may include the components or functionalities as shown in the generative AI subsystem 200 of FIG. 2.

In some embodiments, the baseline parameters may include an expected screen progression 802, as shown in FIG. 8, of the display device 304. It is to be understood the screen progression (e.g., the expected screen progression 802) shown in FIG. 8 is for illustrative purposes only and does not limit or restrict the same, similar, or different screen progressions. For example, a screen progression of a display device (e.g., the display device 304) may include one or more of the same screens as represented in FIG. 8, or any combination of different screens. In this regard, the expected screen progression 802 may include a screen progression the display device 304 displays when a user interacts with the display device 304.

For example, a user may initially interact with a first screen 806 of the display device 304, which may also be the display device's 304 initial state (e.g., similar to a screen-saver, a welcome screen, or the like). After a user interacts with the first screen 806, a second screen 808 may be expected or programmed to be displayed. Further, a third screen 810, a fourth screen 812, or a fifth screen 814 may be expected or programmed to be displayed depending on the selection of the user on the second screen 808. For example, the user may select "View Balance" on the second screen 808, and the display device 304 may be expected to show the fourth screen 810 which shows the user's balance. Further still, the expected screen progression 802 may continue with one or more screens 816 programmed or expected to be displayed upon a certain interaction received from the user. In this regard, the expected screen progression 802 may include the display device's 304 response (e.g., what the display device is displaying) to an interaction from a user. Further, the expected screen progression 802 may include all of the instances of the possible interactions of the user, including expected errors, faults, or the like, that may be produced during a user's interaction.

In some embodiments, the expected screen progression 802 may be used to train the AI engine. The AI engine may learn the expected screen progression 802 by ingesting all the possible screen progressions via its data ingestion engine (e.g., data ingestion engine 202 in FIG. 2). Further, the model training engine 206 may be used to train the AI engine to learn and understand the expected screen progression 802 as a user interacts with the display device 304.

Further, in some embodiments, the AI engine may be trained on the expected screen progression 802 in a training environment. In this way, the AI engine may learn the expected screen progression 802, which may include the actual display values 416 displayed as the display device 304 displays the different screens (e.g., the first screen 806, the second screen 808, and so on).

In some embodiments, the AI engine may then be trained in a semi-controlled environment, wherein the display device 304 is placed in an environment with one or more additional lighting sources. In this way, the one or more additional lighting sources may simulate lighting sources that may be present during real-world use of the system 130. Further, the additional lighting sources may produce light patterns that may be detected on the monitoring device 308, which the AI engine will be trained to understand the difference between. For example, an additional light source may cast an additional light pattern on the display device 304, which may be detected by the AI engine (via the monitoring device 308).

In some embodiments, the AI engine may be configured to determine the anomaly associated with the display device in real time based on the difference between the expected display value and the actual display value.

In some embodiments, the AI engine may be able to detect an anomaly based on the actual screen progression (e.g., the actual display values 416) compared with the expected screen progression 802 (e.g., the expected display values 418). In some embodiments, the actual display value may include a first display value. In some embodiments, the anomaly may include the display device emitting the first display value in an instance in which the display device is expected to be emitting a second display value. For example, the anomaly screen progression 804 may include an instance in which the display device 304 freezes or gets stuck at a particular screen. In the example shown in FIG. 8, the anomaly screen progression 804 may include a scenario where the display device 304 freezes at the second screen 808, no matter how the user interacts with the display device 304. In this example, the AI engine may be able to determine an anomaly exists because the screen should be progressing differently based on the expected screen progression 802.

In some embodiments, the monitoring device may receive an unexpected light pattern associated with a second light source. In some embodiments, the AI engine may be further configured to determine the unexpected light pattern and determine the anomaly is not caused by the unexpected light pattern. For example, as shown in FIG. 7, the measuring device 308 may receive an unexpected light pattern 704 from a second light source 702. In some embodiments, the measuring device 308 may be receiving both the light patterns 306 emitted from the display device 304 and the unexpected light pattern 704 emitted from the second light source 702. Further, in some embodiments, the measuring device 308 may transmit the data, values, information, or the like associated with the light (e.g., the light patterns 306 and/or the unexpected light patterns 704) to the monitoring system 312.

Further, the monitoring system 312 may be able to determine the unexpected light source 706. In this way, and in some embodiments, the AI engine associated with the monitoring system 312 may be able to determine that the unexpected light pattern 704 is from the second light source 702 based on the training of the AI engine. In this way, system may be able to perform pattern recognition 314 of the light patterns received by the monitoring device 308 and may be able to determine an anomaly 316.

FIG. 9 illustrates an example process flow 900 of the solutions as described herein. In some embodiments, a method may include receiving, via a monitoring device, an actual display value, wherein the actual display value includes one or more light patterns emitted from a display device, as shown in block 902. For example, the method may include using a monitoring device 308, as described above, to receive the one or more light patterns 306 emitted from a display device 304.

Further, as shown in block 904, in some embodiments, the method may include determining an expected display value, wherein the expected display value includes one or more expected light patterns that are expected to be emitted from the display device. The expected display value may be determined using one or more of the processes as described herein. For example, the expected display value may be determined via an AI engine. The AI engine may be trained on the expected screen progression (e.g., the expected screen progression 802 as shown in FIG. 8) to be able to determine an anomaly screen progression (e.g., the anomaly screen progression 804).

Further, as shown in block 906, in some embodiments, the method may include determining an anomaly associated with the display device, wherein the anomaly includes a difference between the actual display value and the expected display value. In this way, determining the difference between the actual display value (e.g., the actual display value 416 as shown in FIG. 4) and the expected display value (e.g., the expected display value 418) may include analyzing the light patterns 306 emitted from the display device, as described above. For example, the differences between the actual display value and the expected display value may include differences between the wavelength, intensity, lumen value, kelvin value, color value, or the like.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for determining device output, the system comprising:

- a processing device;
- a non-transitory storage device containing instructions when executed by the processing device, causes the processing device to perform the steps of:
  - receive, via a monitoring device, an actual display value, wherein the actual display value comprises one or more light patterns emitted from a display device;
  - determine, via an artificial intelligence (AI) engine, an expected display value in real time, wherein the expected display value comprises one or more expected light patterns that are expected to be emitted from the display device, wherein the AI engine is trained on baseline parameters associated with the expected display value;
  - determine, via the AI engine and in real time, an anomaly associated with the display device, wherein the anomaly comprises a difference between the actual display value and the expected display value; and
  - receive, via the monitoring device, an unexpected light pattern associated with a second light source that is separate and distinct from the display device, wherein the AI engine is further configured to:
    - determine the unexpected light pattern is a reflection on the display device caused by the second light source, and
    - determine the anomaly is not caused by the unexpected light pattern.

2. The system of claim 1, wherein the display device is associated with a first platform, and wherein the monitoring device is associated with a second platform.

3. The system of claim 2, wherein the second platform is functional in an instance in which the first platform experiences the anomaly associated with the display device.

4. The system of claim 1, wherein the actual display value further comprises at least one of:

- lumen data comprising a brightness of the one or more light patterns;
- kelvin data comprising a color tone of the one or more light patterns; or
- color data comprising a color of the one or more light patterns.

5. The system of claim 1, wherein the monitoring device comprises a photoelectric device configured to generate, based on the one or more light patterns, at least one of:

- a lumen value comprising a brightness of the one or more light patterns;
- a kelvin value comprising a color tone of the one or more light patterns; or
- a color value comprising a color of the one or more light patterns.

6. The system of claim 5, wherein the anomaly comprises the lumen value associated with the actual display value being less than an expected lumen value associated with the expected display value.

7. The system of claim 1, wherein the monitoring device is operatively coupled to the display device.

8. The system of claim 1, wherein the monitoring device receives the actual display value associated with the one or more light patterns emitted from at least a portion of the display device.

9. The system of claim 1, wherein the monitoring device receives the actual display value associated with the one or more light patterns emitted from the entire display device.

10. The system of claim 1, wherein the actual display value comprises a first display value, and wherein the anomaly comprises the display device emitting the first display value in an instance in which the display device is expected to be emitting a second display value.

11. A computer program product for determining device output, the computer program product comprising a non-transitory computer-readable medium comprising code causing an apparatus to:

- receive, via a monitoring device, an actual display value, wherein the actual display value comprises one or more light patterns emitted from a display device;
- determine, via an artificial intelligence (AI) engine, an expected display value in real time, wherein the expected display value comprises one or more expected light patterns that are expected to be emitted from the display device, wherein the AI engine is trained on baseline parameters associated with the expected display value;
- determine, via the AI engine and in real time, an anomaly associated with the display device, wherein the anomaly comprises a difference between the actual display value and the expected display value; and
- receive, via the monitoring device, an unexpected light pattern associated with a second light source that is separate and distinct from the display device, wherein the AI engine is further configured to:
  - determine the unexpected light pattern is a reflection on the display device caused by the second light source, and
  - determine the anomaly is not caused by the unexpected light pattern.

12. The computer program product of claim 11, wherein the display device is associated with a first platform, and wherein the monitoring device is associated with a second platform.

13. The computer program product of claim 12, wherein the second platform is functional in an instance in which the first platform experiences the anomaly associated with the display device.

14. The computer program product of claim 11, wherein the actual display value further comprises at least one of:

lumen data comprising a brightness of the one or more light patterns;

kelvin data comprising a color tone of the one or more light patterns; or color data comprising a color of the one or more light patterns.

15. The computer program product of claim 11, wherein the monitoring device comprises a photoelectric device configured to generate, based on the one or more light patterns, at least one of:

a lumen value comprising a brightness of the one or more light patterns;

a kelvin value comprising a color tone of the one or more light patterns; or a color value comprising a color of the one or more light patterns.

16. The computer program product of claim 15, wherein the anomaly comprises the lumen value associated with the actual display value being less than an expected lumen value associated with the expected display value.

17. A method for determining device output, the method comprising:

receiving, via a monitoring device, an actual display value, wherein the actual display value comprises one or more light patterns emitted from a display device;

determining, via an artificial intelligence (AI) engine, an expected display value in real time, wherein the expected display value comprises one or more expected light patterns that are expected to be emitted from the display device, wherein the AI engine is trained on baseline parameters associated with the expected display value;

determining, via the AI engine and in real time, an anomaly associated with the display device, wherein the anomaly comprises a difference between the actual display value and the expected display value; and receiving, via the monitoring device, an unexpected light pattern associated with a second light source that is separate and distinct from the display device, wherein the AI engine is further configured to:

determine the unexpected light pattern is a reflection on the display device caused by the second light source, and determine the anomaly is not caused by the unexpected light pattern.

* * * * *